United States Patent Office 2,822,578
Patented Feb. 11, 1958

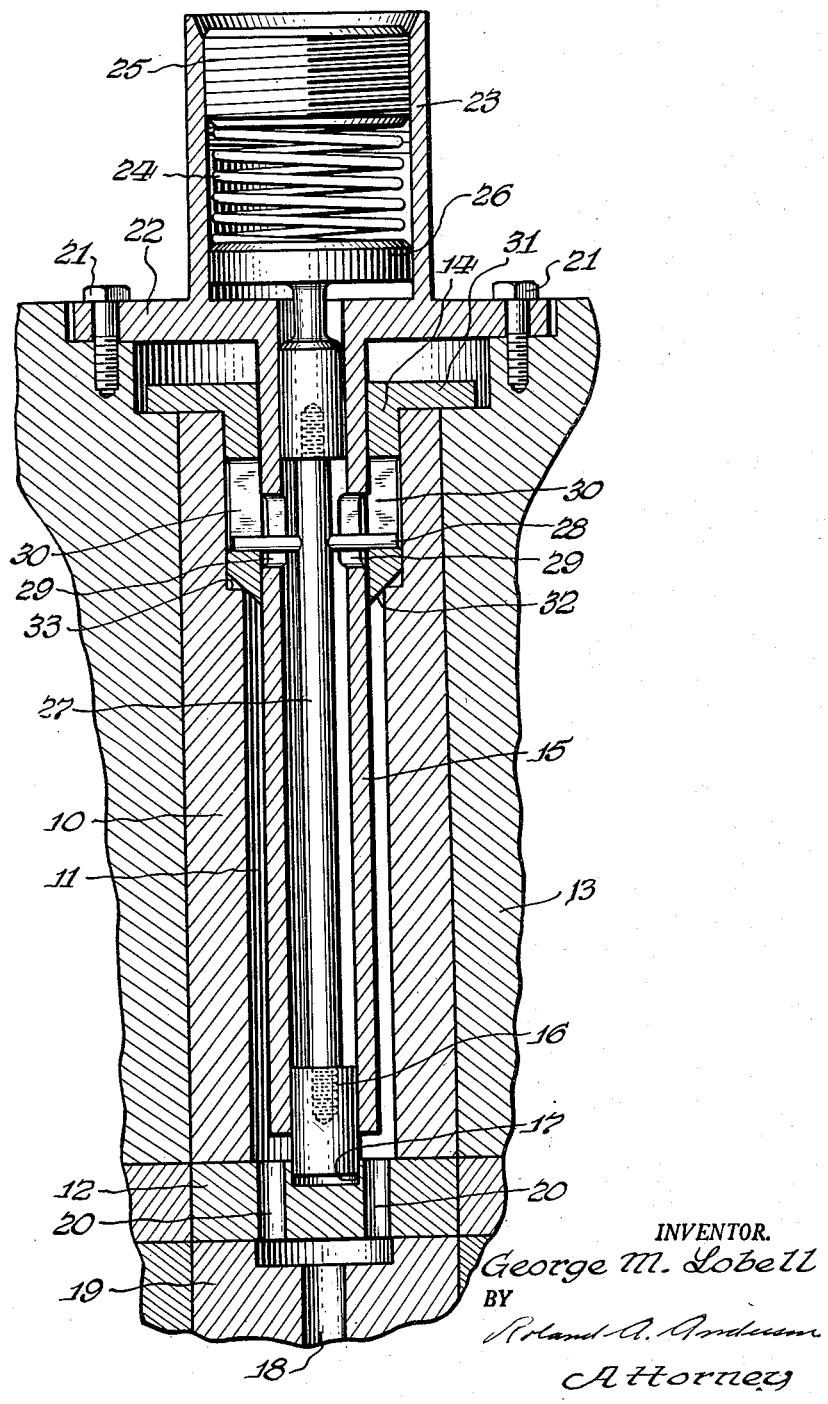

2,822,578

INJECTION-MOULDING APPARATUS

George M. Lobell, Midlothian, Ill., assignor to the United States of America as represented by the United States Atomic Energy Commission Application September 6, 1956, Serial No. 608,413

4 Claims. (Cl. 18—42)

The present invention relates to an injection-moulding apparatus, and, more particularly, to one for injection-moulding a tube closed at one end.

Previously the length of an injection-moulded tube closed at one end was limited, because the unsupported core end required to produce the closed end of the tube would be pushed toward one side or the other of the mould cavity by the injection-moulding and thus produce an undesirable variation in tube thickness.

The present invention overcomes this difficulty and thus increases the length of an injection-moulded tube closed at one end, by supporting the core at the region where the closed end of the tube is to be formed without interfering with the formation of the closed end.

The single figure of the drawing shows a longitudinal sectional view of the injection-moulding apparatus of the present invention.

A mould body 10 having a cylindrical cavity 11 and an end piece 12 is mounted in a bed 13. A bushing 14 is mounted in one end of the mould body 10 in an enlarged portion of the cavity 11. The bushing 14 receives and centers one end of a tubular core 15, the other end of which receives a plug 16 and is centered thereby. The plug 16 is positionable in a recess 17 in the end piece 12. An inlet 18 to the mould cavity 11 is provided in a piece 19 and in the end piece 12 where the inlet splits into two branches 20 located on opposite sides of the recess 17.

The core 15 is retained in the mould cavity 11 by screws 21 which are threaded into the bed 13 and pass loosely through openings in a flange 22 formed on the core 15. Beyond the flange 22 the core 15 has an enlarged hollow extension 23 which houses a spring 24. The spring acts at one end against a plug 25 threaded into the hollow extension 23 and at the other end against a head member 26 which is slidably positioned on the hollow extension 23 and in the core 15 proper. A rod 27 has threaded connections at its ends with the head member 26 and the plug 16. A pin 28 fixed to and extending transversely through the rod 27 goes through elongated slots 29 in the core 15 into elongated slots 30 in the bushing 14.

At the start of an injection-moulding cycle the parts are positioned as shown in the figure; i. e., the plug is seated in the recess 17 in the end piece 12, through the action of the spring 24 transmitted through the head member 26 and the rod 27; the bushing 14 is in its fully inserted position, with a flange 31 thereon resting against the end of the mould body 10, and a conical surface 32 on the bushing 14 directly adjacent a shoulder 33 formed in the mould cavity 11, all because of the engagement of the pin 28 with the ends of the slots 30 in the bushing 14.

When molten material is injected through the inlet 18 into the mould cavity 11, it fills the mould cavity and soon reaches the conical surface 32 on the bushing 14. As injection of material continues, the bushing 14 is lifted from its seat on the mould body 10, permitting a flange to be formed on the open end of the tube. At the same time the lifting of the bushing 14 is transmitted through the pin 28 and the rod 27 to the plug 16 which is lifted out of the recess 17 and retracts until it is flush with the adjacent end of core 15. With the plug 16 retracted as stated, the material injected flows across the end of the core 15 and the plug 16 to form the closed end of the tube. The plug 16 cannot retract beyond the position in which it is flush with the end of the core 15, because in this position engagement between the bushing 14 and the flange 22 takes place.

The present apparatus is suitable for making test tubes of polymerized trifluorchloroethylene, and in this event the mould body 10, end piece 12, bushing 14, core 15, plug 16, piece 19, rod 27, pin 28, and head member 26 are preferably made of #440 stainless steel. When the above material is injection-moulded, the apparatus is preferably held at 325° F., and the injection nozzle (not shown) by which the molten material is fed to the inlet 18 at 525° F.

It will be appreciated that with the apparatus of the present invention the thickness of the tube wall produced will be uniform throughout, because the core 15 is centered by the bushing 14 at all times and by the plug 16 until the closed end of the tube is about to be formed, and this, of course, occurs only after the tube wall has been formed.

After the tube is completely formed, the tube, bushing 14, core 15, plug 16, rod 27, and pin 28 are removed from the mould body 10. Now stripping of the tube from the core 15 is facilitated by shifting of the bushing 14 along the core 15, such shifting of the bushing being made possible by the elongated slots 30 which receive the pin 28.

It is important that the plug 16 fit tightly in the recess 17 so that the plug 16 will not be retracted by entry of injected material in the recess 17 before the wall of the tube is completely formed, but only by lifting of the bushing 14 occurring after complete formation of the tube wall.

The tube formed by the present apparatus will have to be finished by removal of the projection formed by entry of injected material into the recess 17 and by removal of the sprues formed on the branches 20. The conical surface 32 on the bushing 14 and the shoulder 33 in the mould cavity 11 cause the open end of the tube to have a flange provided with a conical interior.

It is also understood that the invention is not to be limited by the details given herein but that it may be modified within the scope of the appended claims.

What is claimed is:

1. An injection-moulding apparatus for producing a tube closed at one end, said apparatus comprising a mould having a cavity, a recess at one end of the cavity, and an inlet at said one end of the cavity for material to be injected in the mould, a bushing slidably mounted in the other end of the cavity, a tubular core fitting the bushing and projecting through the cavity into closely spaced relation with the said one end of the cavity, a plug slidably mounted in the end of the core adjacent the said one end of the cavity and projecting from the core into the said recess so as to cooperate with the bushing in centering the core in the cavity, a rod attached to the plug and projecting therefrom freely within the core to the end thereof away from the plug, a spring acting between the core and the end of the rod away from the plug so as to make the plug protrude from the core into the said one end of the mould cavity, and means connecting the rod and the bushing so as to cause retraction of the bushing due to pressure thereagainst of material being injected in the mould cavity to bring about complete retraction of the plug into the core, whereby the closed end of the tube is formed.

2. The apparatus specified in claim 1, the inlet for material into the cavity comprising two branches positioned on opposite sides of the recess adapted to receive the plug.

3. The apparatus specified in claim 1, the means connecting the bushing and the rod comprising a pin and a slot, whereby the bushing may move with respect to the rod and the plug for stripping the tube from the core.

4. An injection-moulding apparatus for producing a tube closed at one end, said apparatus comprising a mould having a cavity, a recess at one end of the cavity, and an inlet at said one end of the cavity for material to be injected in the mould, a bushing slidably mounted in the other end of the cavity, a core fitting the bushing and projecting through the cavity into closely spaced relation with the said one end of the cavity, a plug slidably mounted in the end of the core adjacent the said one end of the cavity and projecting from the core into the said recess so as to cooperate with the bushing in centering the core in the cavity, resilient means making the plug protrude from the core into the said one end of the mould cavity, and means connecting the plug and the bushing so as to cause retraction of the bushing due to pressure thereagainst of material being injected in the mould cavity to bring about complete retraction of the plug into the core, whereby the base of the test tube is formed.

References Cited in the file of this patent
UNITED STATES PATENTS 2,434,594   Schultz _____ Jan. 13, 1948

FOREIGN PATENTS 388,662   Great Britain _____ Mar. 2, 1933